United States Patent
Yi et al.

(10) Patent No.: US 9,959,079 B2
(45) Date of Patent: May 1, 2018

(54) WRITING DATA INTO REDUNDANT ARRAY OF INDEPENDENT DISKS (RAID) OF STORAGE SYSTEM

(71) Applicant: HUAWEI TECHNOLOGIES CO., LTD., Shenzhen, Guangdong (CN)

(72) Inventors: Letian Yi, Shenzhen (CN); Xin Fang, Beijing (CN); Zhenhua Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/630,970

(22) Filed: Jun. 23, 2017

(65) Prior Publication Data
US 2017/0308332 A1    Oct. 26, 2017

Related U.S. Application Data

(63) Continuation of application No. PCT/CN2014/095855, filed on Dec. 31, 2014.

(51) Int. Cl.
*G06F 3/06* (2006.01)
*G06F 11/10* (2006.01)

(52) U.S. Cl.
CPC .......... G06F 3/0689 (2013.01); G06F 3/0619 (2013.01); G06F 3/0665 (2013.01); *G06F 11/108* (2013.01); *G06F 11/1084* (2013.01)

(58) Field of Classification Search
CPC ................ G06F 3/0689; G06F 3/0665; G06F 2211/1002; G06F 2211/1004–2211/1095; G06F 11/1076; G06F 11/108; G06F 11/1084; G06F 11/1088; G06F 11/1092; G06F 11/1096; G06F 3/0619
(Continued)

(56) References Cited

U.S. PATENT DOCUMENTS 8,060,772 B2    11/2011   Abali et al.
8,099,623 B1    1/2012    Li et al.
(Continued)

FOREIGN PATENT DOCUMENTS

CN     1815455 A       8/2006
CN     101093434 A     12/2007
(Continued)

OTHER PUBLICATIONS

Apple, "What is a Hot Spare?", posted Nov. 18, 2013, hosted by the Thecus Blog, <http://blog.thecus.com/what-is-a-hot-spare/>.*
(Continued)

*Primary Examiner* — Reginald G Bragdon
*Assistant Examiner* — Aaron D Ho
(74) *Attorney, Agent, or Firm* — Huawei Technologies Co., Ltd.

(57) ABSTRACT

In a storage system, a control device determines that at least one first storage device of X storage devices is out of service. Then, the control device selects a second storage device from the X storage device. A quantity of stripe members of a data stripe stored in the second storage device is less than a ratio of T divided by X. The control device further writes target data into the second storage device. The target data is a data unit or a check unit used to update at least one stripe member of the data stripe stored in the first storage device.

16 Claims, 10 Drawing Sheets

(58) Field of Classification Search
  USPC .......................................................... 711/114
  See application file for complete search history.

(56) References Cited

U.S. PATENT DOCUMENTS

| | | | |
|---|---|---|---|
| 8,453,036 B1* | 5/2013 | Goel | G06F 11/1096 |
| | | | 714/763 |
| 8,812,779 B2* | 8/2014 | Eguchi | G06F 11/1076 |
| | | | 711/114 |
| 8,839,028 B1 | 9/2014 | Polia et al. | |
| 2003/0070042 A1 | 4/2003 | Byrd et al. | |
| 2004/0250161 A1 | 12/2004 | Patterson | |
| 2006/0149999 A1 | 7/2006 | Hung | |
| 2008/0010502 A1 | 1/2008 | Baek et al. | |
| 2012/0221533 A1 | 8/2012 | Burness et al. | |
| 2014/0359347 A1 | 12/2014 | Fuxa | |

FOREIGN PATENT DOCUMENTS

| | | |
|---|---|---|
| CN | 101923501 A | 12/2010 |
| CN | 102081559 A | 6/2011 |
| CN | 102520890 A | 6/2012 |
| CN | 104035830 A | 9/2014 |

OTHER PUBLICATIONS

P. F. Corbett, R. English, A. Goel, T. Grcanac, S. Kleiman, J. Leong, and S. Sankar. "Row-diagonal parity for double disk failure correction". In Proc. of the FAST '04 Conference on File and Storage Technologies, 2004.*

Richard R. Muntz and John C. S. Lui. 1990. "Performance Analysis of Disk Arrays under Failure". In Proceedings of the 16th International Conference on Very Large Data Bases (VLDB '90), Dennis McLeod, Ron Sacks-Davis, and Hans-Jorg Schek (Eds.). Morgan Kaufmann Publishers Inc., San Francisco, CA, USA, 162-173.*

* cited by examiner

| | Storage server 1 | Storage server 2 | Storage server 3 | Storage server 4 | Storage server 5 | Storage server 6 |
|----|----|----|----|----|----|----|
| T0 | A0 | B0 | C0 | D0 | P0 | Q0 |
| T1 | A1 | B1 | C1 | D1 | P0 | Q0 |
| T2 | A1 | B1 | C1 | D1 | P0 | Q0 |

|    | Storage server 1 | Storage server 2 | Storage server 3 | Storage server 4 | Storage server 5 | Storage server 6 |
|----|------|------|------|------|------|------|
| T0 | A0 | B0 | C0 | D0 | P0 | Q0 |
| T1 | A1 | B1 | C1 | D1 | P0 | Q0 |
|    | P1 | Q1 | P1 | Q1 |    |    |
|    | Q1 | P1 |    |    |    |    |
| T2 | A1 | B1 | C1 | D1 | P0 | Q0 |
|    | P1 | Q1 | P1 | Q1 |    |    |
|    | Q1 | P1 |    |    |    |    |

FIG. 5C

|    | Storage server 1 | Storage server 2 | Storage server 2 | Storage server 4 | Storage server 5 |
|----|------|------|------|------|------|
| T0 | A0 | B0 | C0 | D0 | P0 |
| T1 | A1 | B1 | C1 | D1 | P0 |
|    |    |    | P1 |    |    |
| T2 | A1 | B1 | C1 | D1 | P0 |
|    |    |    | P1 |    |    |

FIG. 5D

|  | Storage server 1 | Storage server 2 | Storage server 3 | Storage server 4 | Storage server 5 |
|---|---|---|---|---|---|
| T0 | A0 | B0 | C0 | D0 | P0 |
| T1 | A1 | B1 | C1 | D1 | P0 |
|  |  | P1 | P1 |  |  |
| T2 | A1 | B1 | C1 | D1 | P0 |
|  |  | P1 | P1 |  |  |

FIG. 5E

|  | Storage server 1 | Storage server 2 | Storage server 3 | Storage server 4 | Storage server 5 |
|---|---|---|---|---|---|
| T0 | A0 | B0 | C0 | D0 | P0 |
|  | Q0 |  |  |  |  |
| T1 | A1 | B1 | C0 | D1 | P1 |
|  | Q1 | C1 |  |  |  |
| T2 | A1 | B1 | C0 | D1 | P1 |
|  | Q1 | C1 |  |  |  |

FIG. 5F

WRITING DATA INTO REDUNDANT ARRAY OF INDEPENDENT DISKS (RAID) OF STORAGE SYSTEM

CROSS-REFERENCE TO RELATED APPLICATIONS

This application is a continuation of International Application No. PCT/CN2014/095855, filed on Dec. 31, 2014, which is hereby incorporated by reference in its entirety.

TECHNICAL FIELD

Embodiments of the present application relate to the field of storage technologies, and in particular, to a method for writing data into a storage system, and a storage system that uses the method.

BACKGROUND

In a storage system, multiple storage servers are connected to each other to form a distributed system. A data storage task is performed in the system in coordination. However, a storage task may fail if a storage server is out of service. Therefore, to tolerate the out-of-service storage server, the storage system generally uses a manner of data redundancy storage. A typical approach is using a redundant array of independent disks (RAID). According to the RAID technology, a data block is divided into multiple data units, check units are obtained through exclusive OR calculations among the multiple data units, and the data units and the check units are stored in different storage servers. When a storage server is out of service, contents of data stored in the out-of-service storage server can be obtained through calculation by using the data units and the check units that are stored in storage servers that are not out of service, and therefore, that the out-of-service storage server is tolerable. During the out-of-service period of the storage server, because the contents of the data stored in the out-of-service storage server can be reacquired through calculation, the storage system is still allowed to provide a service, and the service in this case is referred to as a degraded service.

Generally, being permanently out of service means that a storage server in a storage system is faulty and is permanently excluded in the storage system. Being transiently out of service means that a storage server in a storage system is determined to be out of service within a period of time due to performance jitter or the like, but after the period of time, the storage server may rejoin the storage system.

If a storage server is out of service transiently, and another storage server is out of service shortly after the transiently out-of-service storage server rejoins the storage system, there might be permanent data loss.

SUMMARY

Embodiments of the present application provide a method for writing data into a storage system and a storage system, so that even if another storage device is permanently out of service after a transiently out-of-service storage device joins a storage system again, provided that a quantity of members stored in the permanently out-of-service storage device does not exceed a quantity of out-of-service members that is allowed by a RAID, data reliability can still be ensured.

A first aspect of the embodiments of the present application provides a method for writing data into a storage system, where the storage system includes a redundant array of independent disks (RAID), the RAID includes a control device and X storage devices, a data stripe is stored in the RAID, and the stripe includes T members; and the method is performed by the control device and includes: determining, by the control device, that at least one first storage device of the X storage devices is out of service, where at least one member is stored in the first storage device; selecting a second storage device from the X storage devices, where a quantity of members stored in the second storage device is less than T/X; and writing target data into the second storage device, where the target data is a data unit or a check unit used to update the at least one member that is stored in the first storage device.

In a first possible implementation manner of the first aspect, T>X, and T is not equal to a multiple of X; and T=N+M, where N is a quantity of data units in the T members, M is a quantity of check units generated according to the N data units, N≥2, and M≥1.

With reference to the first aspect or the first possible implementation manner of the first aspect, in a second possible implementation manner, the second storage device is a storage device of the X storage devices that stores the fewest members.

With reference to the first aspect or either of the first and second possible implementation manners of the first aspect, in a third possible implementation manner, the method further includes: determining, by the control device, that the target data is the data unit or the check unit used to update the at least one member that is stored in the first storage device.

With reference to the third possible implementation manner of the first aspect, in a fourth possible implementation manner, a logical address of the at least one member that is stored in the first storage device is stored in the control device, and the method further includes: dividing, by the control device, a received data object, to generate the target data; and allocating a logical address to the target data; and the determining that the target data is the data unit or the check unit used to update the at least one member that is stored in the first storage device specifically refers to determining that the allocated logical address is the same as the logical address of the at least one member that is stored in the first storage device.

With reference to the first aspect or any one of the first to fourth possible implementation manners of the first aspect, in a fifth possible implementation manner, a quantity of members stored in the at least one first storage device reaches a quantity of out-of-service members that is tolerable to the RAID.

With reference to the first aspect or any one of the first to fifth possible implementation manners of the first aspect, in a sixth possible implementation manner, the control device is a controller, and the storage device is a disk.

With reference to the first aspect or any one of the first to fifth possible implementation manners of the first aspect, in a seventh possible implementation manner, the storage device is a storage server, and the control device is any one of the X storage servers.

With reference to the first aspect or any one of the first to seventh possible implementation manners of the first aspect, in an eighth possible implementation manner, a type of the RAID is RAID 6.

A second aspect of the embodiments of the present application provides a method for writing data into a storage system, where the storage system includes a redundant array of independent disks (RAID), the RAID includes a control device and X storage devices, a data stripe stripe is stored in the RAID, and the stripe includes (N+M) members, where N is a quantity of data units in the members, M is a quantity of check units generated according to the N data units, N≥2, M≥1, and N+M≥X; and the method is performed by the control device and includes: determining, by the control device, that at least one first storage device of the X storage devices is out of service, where at least one member is stored in the first storage device; and writing target data into (Y+1) second storage devices of the X storage devices, where Y=M−(⌈(N+M)/X⌉−1), and the target data is a data unit or a check unit used to update the at least one member that is stored in the first storage device.

In a first possible implementation manner of the second aspect, the method further includes: determining, by the control device, that the target data is the data unit or the check unit used to update the at least one member that is stored in the first storage device.

With reference to the first possible implementation manner of the second aspect, in a second possible implementation manner, a logical address of the at least one member that is stored in the first storage device is stored in the control device, and the method further includes: dividing, by the control device, a received data object, to generate the target data; and allocating a logical address to the target data; and the determining that the target data is the data unit or the check unit used to update the at least one member that is stored in the first storage device specifically refers to determining that the allocated logical address is the same as the logical address of the at least one member that is stored in the first storage device.

With reference to the second aspect or either of the first and second possible implementation manners of the second aspect, in a third possible implementation manner, a quantity of members stored in the at least one first storage device reaches a quantity of out-of-service members that is tolerable to the RAID.

With reference to the second aspect or any one of the first to third possible implementation manners of the second aspect, in a fourth possible implementation manner, the control device is a controller, and the storage device is a disk.

With reference to the second aspect or any one of the first to third possible implementation manners of the second aspect, in a fifth possible implementation manner, the storage device is a storage server, and the control device is any one of the X storage servers.

With reference to the second aspect or any one of the first to fifth possible implementation manners of the second aspect, in a sixth possible implementation manner, a type of the RAID is RAID 6.

With reference to the second aspect, in a seventh possible implementation manner, when N+M=X, a type of the RAID is RAID 5.

A third aspect of the embodiments of the present application provides a storage system, where the storage system includes a redundant array of independent disks (RAID), the RAID includes a control device and X storage devices, a data stripe is stored in the RAID, and the stripe includes T members; the X storage devices are configured to store the T members; and the control device is configured to determine that at least one first storage device of the X storage devices is out of service, where at least one member is stored in the first storage device; select a second storage device from the X storage devices, where a quantity of members stored in the second storage device is less than T/X; and write target data into the second storage device, where the target data is a data unit or a check unit used to update the at least one member that is stored in the first storage device.

With reference to the third aspect, in a first possible implementation manner of the third aspect, T>X, and T is not equal to a multiple of X; and T=N+M, where N is a quantity of data units in the T members, M is a quantity of check units generated according to the N data units, N≥2, and M≥1.

With reference to the third aspect or the first possible implementation manner of the third aspect, in a second possible implementation manner, the second storage device is a storage device of the X storage devices that stores the fewest members.

With reference to the third aspect or either of the first and second possible implementation manners of the third aspect, in a third possible implementation manner, the control device is further configured to determine that the target data is the data unit or the check unit used to update the at least one member that is stored in the first storage device.

With reference to the third possible implementation manner of the third aspect, in a fourth possible implementation manner, the control device is further configured to divide a received data object, to generate the target data, and allocate a logical address to the target data; and the control device is specifically configured to determine that the allocated logical address is the same as a logical address of the at least one member that is stored in the first storage device.

With reference to the third aspect or any one of the first to fourth possible implementation manners of the third aspect, in a fifth possible implementation manner, a quantity of members stored in the at least one first storage device reaches a quantity of out-of-service members that is tolerable to the RAID.

With reference to the third aspect or any one of the first to fifth possible implementation manners of the third aspect, in a sixth possible implementation manner, the control device is a controller, and the storage device is a disk.

With reference to the third aspect or any one of the first to fifth possible implementation manners of the third aspect, in a seventh possible implementation manner, the storage device is a storage server, and the control device is any one of the X storage servers.

With reference to the third aspect or any one of the first to seventh possible implementation manners of the third aspect, in an eighth possible implementation manner, a type of the RAID is RAID 6.

A fourth aspect of the embodiments of the present application provides a storage system, where the storage system includes a redundant array of independent disks (RAID), the RAID includes a control device and X storage devices, a data stripe is stored in the RAID, and the stripe includes (N+M) members, where N is a quantity of data units in the members, M is a quantity of check units generated according to the N data units, N≥2, M≥1, and N+M≥X; the X storage devices are configured to store the (N+M) members; and the control device is configured to determine that at least one first storage device of the X storage devices is out of service, where at least one member is stored in the first storage device; and write target data into (Y+1) second storage devices of the X storage devices, where Y=M−(⌈(N+M)/X⌉−1), and the target data is a data unit or a check unit used to update the at least one member that is stored in the first storage device.

In a first possible implementation manner of the fourth aspect, the control device is further configured to determine that the target data is the data unit or the check unit used to update the at least one member that is stored in the first storage device.

With reference to the first possible implementation manner of the fourth aspect, in a second possible implementation manner, the control device is further configured to divide a received data object, to generate the target data, and allocate a logical address to the target data; and the control device is specifically configured to determine that the allocated logical address is the same as a logical address of the at least one member that is stored in the first storage device.

With reference to the fourth aspect or either of the first and second possible implementation manners of the fourth aspect, in a third possible implementation manner, a quantity of members stored in the at least one first storage device reaches a quantity of out-of-service members that is tolerable to the RAID.

With reference to the fourth aspect or the first to third possible implementation manners of the fourth aspect, in a fourth possible implementation manner, the control device is a controller, and the storage device is a disk.

With reference to the fourth aspect or the first to third possible implementation manners of the fourth aspect, in a fifth possible implementation manner, the storage device is a storage server, and the control device is any one of the X storage servers.

With reference to the fourth aspect or the first to fifth possible implementation manners of the fourth aspect, in a sixth possible implementation manner, a type of the RAID is RAID 6.

With reference to the fourth aspect or the first to fifth possible implementation manners of the fourth aspect, in a seventh possible implementation manner, when N+M=X, a type of the RAID is RAID 5.

The embodiments of the present application provide a method for writing data into a storage system and a storage system. The storage system includes a redundant array of independent disks (RAID), the RAID includes a control device and X storage devices, a data stripe is stored in the RAID, and the stripe includes T members. The control device determines that at least one first storage device of the X storage devices is out of service, where at least one member is stored in the first storage device; selects a second storage device from the X storage devices, where a quantity of members stored in the second storage device is less than T/X; and then writes target data into the second storage device, where the target data is a data unit or a check unit used to update the at least one member that is stored in the first storage device. In the embodiments, a storage device that stores members of a quantity less than T/X may be selected as a replacement of a transiently out-of-service storage device, and a member with which a member stored in the transiently out-of-service storage device is updated is written into the replacement. In this way, even if another storage device is permanently out of service after the transiently out-of-service storage device joins the storage system again, provided that a quantity of members stored in the permanently out-of-service storage device does not exceed a quantity of out-of-service members that is allowed by the RAID, data reliability can still be ensured.

In addition, the embodiments of the present application further provide another method for writing data into a storage system and a storage system. The storage system includes a redundant array of independent disks (RAID), the RAID includes a control device and X storage devices, a data stripe is stored in the RAID, and the stripe includes (N+M) members, where N is a quantity of data units in the members, M is a quantity of check units generated according to the N data units, N≥2, M≥1, and N+M≥X. The control device determines that at least one first storage device of the X storage devices is out of service, where at least one member is stored in the first storage device; and then writes target data into (Y+1) second storage devices of the X storage devices, where Y=M−(⌈(N+M)/X⌉−1), and the target data is a data unit or a check unit used to update the at least one member that is stored in the first storage device. In the embodiments, (Y+1) storage devices may be selected as replacements of a transiently out-of-service storage device, and a member with which a member stored in the transiently out-of-service storage device is updated is written into the (Y+1) replacements. In this way, even if another storage device is permanently out of service after the transiently out-of-service storage device joins the storage system again, provided that a quantity of members stored in the permanently out-of-service storage device does not exceed a quantity of out-of-service members that is allowed by the RAID, data reliability can still be ensured.

BRIEF DESCRIPTION OF DRAWINGS

The following briefly introduces the accompanying drawings used in describing the embodiments.

FIG. 5A-5H are schematic illustrations of selecting a replacement for an out-of-service storage server according to embodiments of the present application;

DESCRIPTION OF EMBODIMENTS

Embodiments of the present application provide a method for writing data into a storage system and a storage system using the method. Even if a storage device is permanently out of service after a transiently out-of-service storage device rejoins the storage system, if a quantity of members stored in the permanently out-of-service storage device does not exceed a quantity of members that is allowed by a redundant array of independent disks (RAID) to be out of service, data reliability of the storage system can still be ensured.

Figures 1, 2:
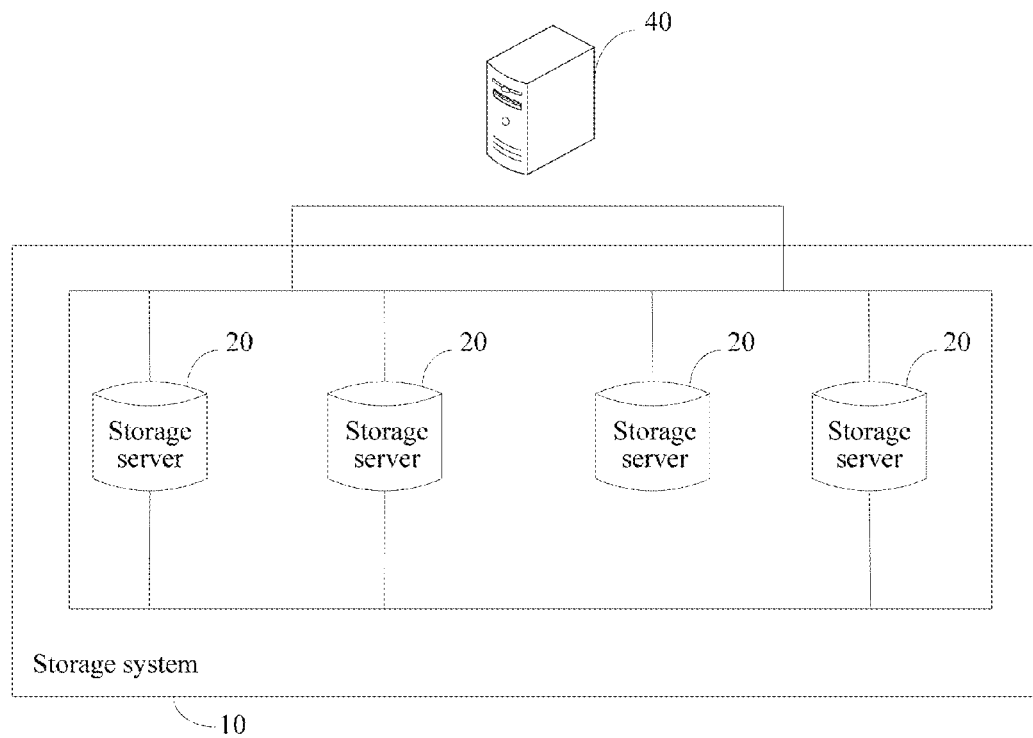
FIG. 1 is a schematic illustration of a scenario in which a storage server is permanently out of service.
FIG. 2 is a schematic diagram of a storage system according to an embodiment of the present application.

Conventionally, if a storage system provides a degraded service, when there is a data update operation, only data units or check units stored in storage servers that are in service are updated. As shown in FIG. 1, storage servers 1 to 6 form a RAID. A, B, C, and D are data units, and P and Q are check units obtained through calculation according to the data units. A, B, C, D, P, and Q together form a stripe of the RAID and are written into the storage servers 1 to 6.

At a time T0, the data units and the check units all are in a $0^{th}$ version, where P0 and Q0 are obtained through calculation by using the data units A0, B0, C0, and D0. At this time, the storage server 5 and the storage server 6 are transiently out of service, the rest storage servers work properly, and the storage system enters a degraded service mode.

At a time T1, a user writes new data into the stripe, to update A0, B0, C0, and D0 to A1 B1, C1, and D1. However, the new data is not written into P1 and Q1. At this time, data stored in the RAID is A1, B1, C1, D1, P0, and Q0.

Suppose that the storage server 5 and the storage server 6 are merely transiently out of service. At a time T2, after the storage server 5 and the storage server 6 rejoin the RAID and when P0 and Q0 have not been updated to P1 and Q1 according to calculation on A1, B1, C1, and D1, the storage server 3 and the storage server 4 are permanently out of service. In this case, data units C1 and D1 are lost forever. The reason is that only A1, B1, P0, and Q0 are stored in the storage system, and C1 and D1 cannot be obtained according to A1, B1, P0, and Q0.

In view of this, the embodiments of the present application provide a method for writing data into a storage system. After a first storage device is determined to be transiently out of service, a proper replacement may be selected for the transiently out-of-service first storage device. When another storage device is permanently out of service after the first storage device rejoins the storage system, if a quantity of members stored in the permanently out-of-service storage device does not exceed a quantity of out-of-service members that is allowed by a RAID, data loss would not not occur, thereby ensuring data reliability.

The following describes application scenarios of the embodiments of the present application.

Scenario 1: FIG. 2 is a schematic illustration of a storage system 10 according to an embodiment of the present application. The storage system 10 includes one or more hosts 40 (in FIG. 2, one host is shown as an example) and multiple storage servers 20. The host may be a computing device, for example, a terminal device such as a server or a desktop computer. The storage server 20 may be a storage device, for example, a storage array. Between the host 40 and a storage server 20, and between the storage servers 20, communications may be carried out by using Network File System (NFS)/Common Internet File System (CIFS) protocol or Fiber Channel (FC) protocol. The multiple storage servers 20 may form one or more RAIDs. For ease of description, in the embodiments, the multiple storage servers 20 forming one RAID is used as an example.

The host 40 may send a write data request to the storage servers 20, where the write data request carries a data object that is to be written into the storage servers, and the data object may be a data block or a file. After receiving the write data request, any one storage server of the multiple storage servers 20 divides the data object into multiple data units, and obtains one or more check units of the multiple data units through calculation by using exclusive OR check or in another manner. The multiple data units and check units may form one stripe and be stored in the RAID, where each data unit or check unit is a member of the stripe. The storage server 20 receiving the write data request then sends each member to a corresponding storage server 20 for storage.

In an optional implementation manner, in the storage system 10 shown in FIG. 2, one of the storage servers 20 may be used as a primary server. The primary server is responsible for receiving the write data request sent by the host 40, dividing the data object into multiple data units, obtaining the check units of the multiple data units through calculation, and then sending each member of the stripe to a corresponding storage server 20 for storage.

Figure 3:
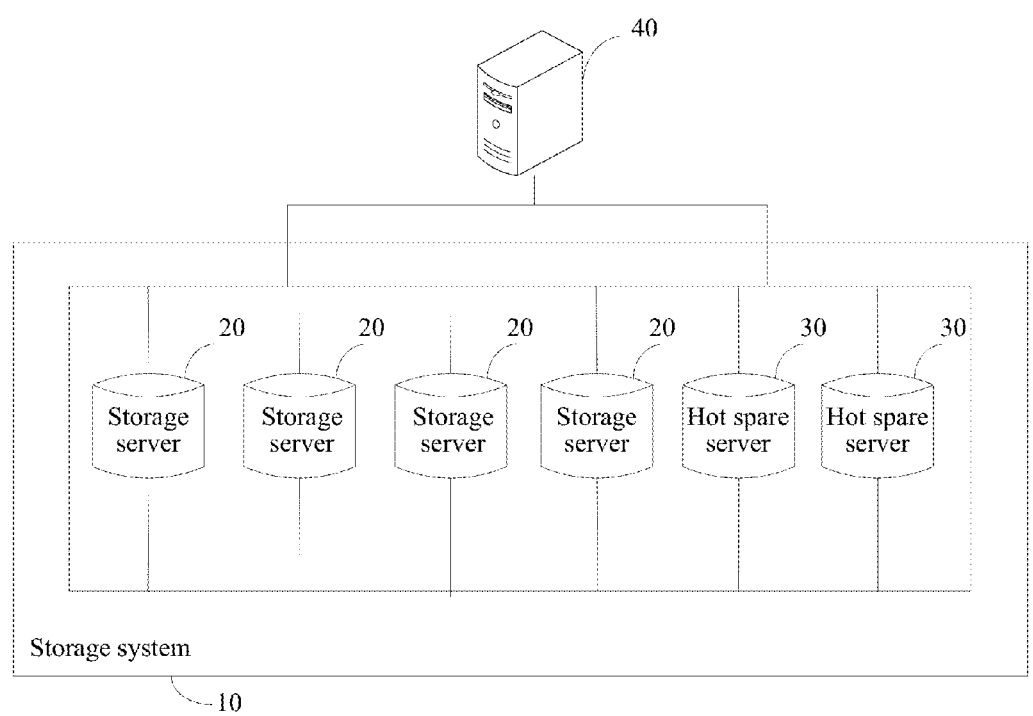
FIG. 3 is a schematic diagram of a storage system according to another embodiment of the present application.

Scenario 2: As shown in FIG. 3, besides storage servers 20 forming a RAID, the storage system 10 may further include a hot spare server 30. The hot spare server 30 does not belong to the RAID, and the hot spare server 30 is a storage server particularly used for replacing a transiently out-of-service storage server. It may be understood that normally the hot spare server 30 does not carry a data service, but once a storage server is transiently out of service, the hot spare server 30 can carry the data service in place of the transiently out-of-service storage server. For example, data that is to be written into the transiently out-of-service storage server is written into the hot spare server 30. Generally, in the storage system 10, there may be one or more hot spare servers 30.

Figure 4:
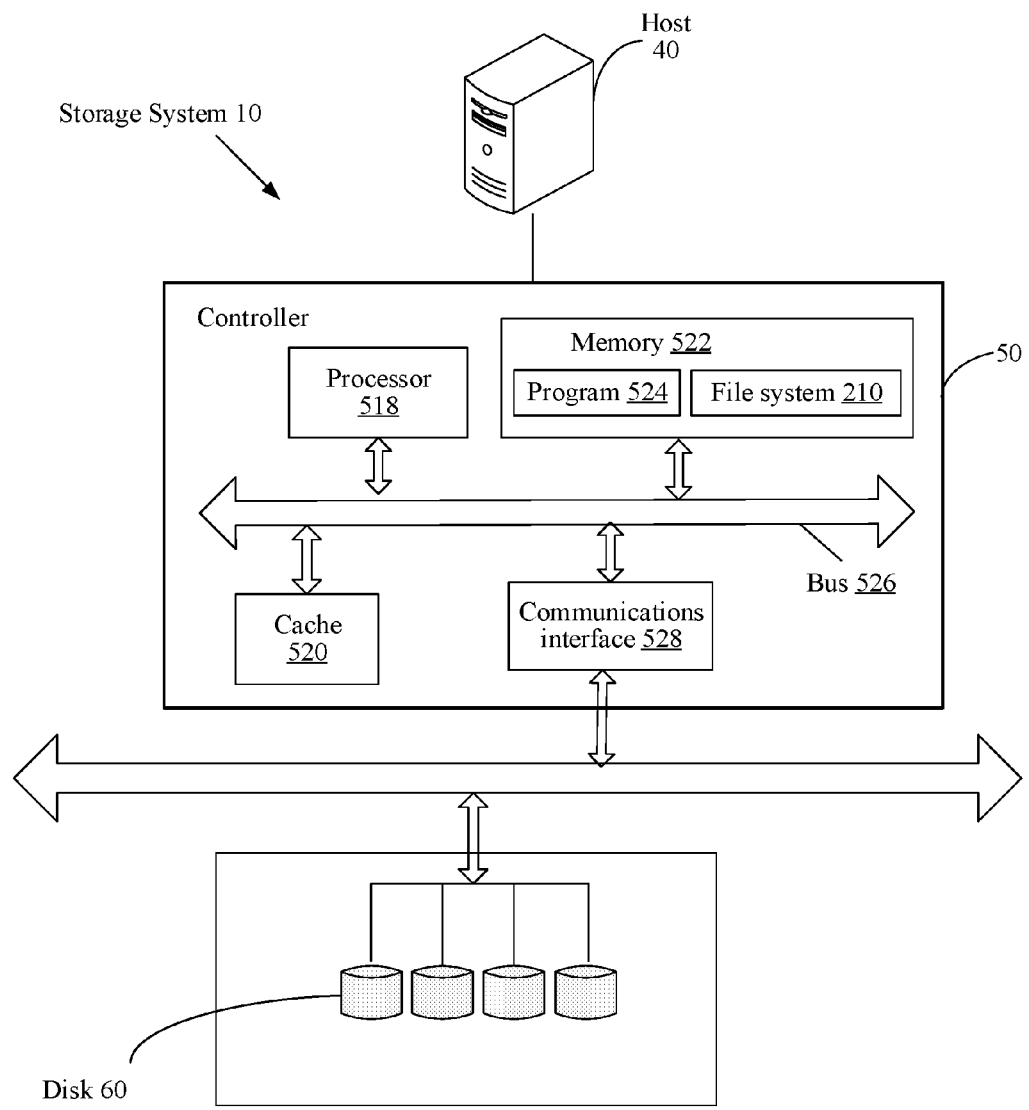
FIG. 4 is a schematic diagram of a storage system according to still another embodiment of the present application.

Scenario 3: As shown in FIG. 4, a storage system 10 includes at least one host 40, at least one controller 50, and multiple disks 60. The host 40 may be a computing device, for example, a terminal device such as a server or a desktop computer. The controller 50 may be a storage server that manages multiple disks 60, and the multiple disks 60 form a RAID. The host 40 may send a write data request to the controller 50, where the write data request carries a data object that is to be written into the storage system. After receiving the write data request, the controller 50 divides the data object into multiple data units, and obtains one or more check units of the multiple data units through calculation by using exclusive OR check or in another manner. The multiple data units and check units may form one stripe and be stored in the RAID, where each data unit or check unit is a member of the stripe. The controller 50 then sends the members to corresponding disks 60 for storage. In addition, besides the disks 60 forming the RAID, one or more hot spare disks (not shown in FIG. 4) may be further included. Functionalities of the hot spare disks are similar to that of the hot spare servers shown in FIG. 3, and details are not described herein again.

As shown in FIG. 4, the controller 50 includes a processor 518, a cache 520, a memory 522, a communications bus 526, and a communications interface 528. The processor 518, the cache 520, the memory 522, and the communications interface 528 communicate with each other by using the communications bus 526.

The communications interface 528 is configured to communicate with the host 40 or a disk 60.

The memory 522 is configured to store a program 524. The memory 522 may include a high-speed random access memory (RAM), and may further include another non-volatile memory, for example, a magnetic disk memory. It is understandable that, the memory 522 can be any one of various non-transitory machine-readable media that is capable of storing program codes, for example, a random access memory (RAM), a hard disk, an optical disc, a solid-state memory (SSD), or other non-volatile memories.

The program 524 includes program codes, where the program codes include a file system 210 and other program codes.

The cache 520 is configured to temporarily store data received from an application server (not shown in FIG. 4) or read data from a disk 60. The cache 520 may be various non-transitory machine-readable media that is capable of storing data, for example, a RAM, a flash memory, or a SSD, which is not limited herein.

In addition, the memory 522 and the cache 520 may be integrated, or they may be installed separately, which is not limited in the embodiments of the present application.

The processor 518 may be a central processing unit (CPU) or an application-specific integrated circuit (ASIC). The processor may be configured as one or more integrated circuits that carry out the process of the embodiments of the present application. In the embodiments of the present application, the processor 518 may be configured to receive requests for various data processing operations from the host 40, for example, a read data operation, a write data operation, and a modify data operation.

In the above three application scenarios, the host 40 may also divide a data object into multiple data units, obtain one or more check units of the multiple data units through calculation, and then separately send each member of the stripe to a corresponding storage server 20 or the controller 50 for storage.

The following uses scenario 1 or scenario 2 as an example to describe, when a storage server 20 in the storage system 10 is transiently out of service, how to select a replacement storage server for the transiently out-of-service storage server 20.

In this embodiment, there may be one or more check units, depending on a type of a RAID. For example, there is one check unit in a RAID 5 (five storage servers), and there are two check units in a RAID 6 (six storage servers).

For ease of description, in this embodiment, N represents a quantity of data units, M represents a quantity of check units, and X represents a quantity of storage servers 20 in the storage system, where N is an integer greater than or equal to 2, M is an integer greater than or equal to 1, and (N+M) is greater than or equal to X.

When (N+M)=X, each storage server 20 stores a member of a stripe. For example, assuming that members of one stripe include A, B, C, D, P, and Q, where A, B, C, and D are data units, and P and Q are check units (the RAID 6 is used as an example herein), and the RAID includes 6 storage servers 20. Storage of each member in storage servers whose IDs are 1 to 6 is shown in Table 1. In addition, a person skilled in the art may understand that, in this case, a quantity of out-of-service members that is tolerable to the RAID is 2.

TABLE 1

| | Storage server ID | | | | | |
|---|---|---|---|---|---|---|
| | 1 | 2 | 3 | 4 | 5 | 6 |
| Member of a stripe | A | B | C | D | P | Q |

When (N+M)>X, and (N+M) is equal to a multiple of X, each storage server 20 stores at least one member of a stripe, and each storage server 20 stores more than one member of the stripe. For example, assuming that the RAID includes only three storage servers 20, storage of each member of the stripe in storage servers whose IDs are 1 to 3 is shown in Table 2.

TABLE 2

| | Storage server ID | | |
|---|---|---|---|
| | 1 | 2 | 3 |
| Member of a stripe | A | B | C |
| | D | P | Q |

When (N+M)>X, and (N+M) is not equal to a multiple of X, each storage server 20 stores at least one member of a stripe, and at least one storage server 20 stores more than one member of the stripe. For example, assuming that the RAID includes only five storage servers 20, storage of each member of the stripe in storage servers whose IDs are 1 to 5 is shown in Table 3.

TABLE 3

| | Storage server ID | | | | |
|---|---|---|---|---|---|
| | 1 | 2 | 3 | 4 | 5 |
| Member of a stripe | A<br>Q | B | C | D | P |

The following cases are separately described below: (N+M)=X; (N+M)>X and (N+M) is equal to a multiple of X; and (N+M)>X, and (N+M) is not equal to a multiple of X.

Case 1: (N+M)=X

1. For a RAID 6, assuming that the RAID includes six storage servers, members of the stripe include four data units and two check units, and a quantity of out-of-service members that is tolerable is 2 (in a storage manner shown in Table 1). In addition, it should be noted that, an example in which a quantity of out-of-service members reaches the quantity of out-of-service members that is tolerable to the RAID is used in the following descriptions. In a case in which the quantity of out-of-service members does not reach the quantity of out-of-service members that is tolerable to the RAID, another manner may also be used to select a replacement, which is not described in detail in this embodiment.

For the scenario 2 (as shown in FIG. 3), when the storage system 10 includes enough hot spare servers 30, the hot spare servers 30 may be used as replacements of a transiently out-of-service storage server 20.

For the scenario 1 (as shown in FIG. 2), when the storage system 10 does not include a hot spare server 30, a storage server 20 that is not transiently out of service needs to be selected from the RAID to work as a replacement of a transiently out-of-service storage server 20.

Generally, there is a relatively low risk in data loss when a storage server 20 storing relatively few members is selected as a replacement (in this embodiment, the storage server storing relatively few members refers to a storage server in which a quantity of stored members is less than an average quantity). However, because (N+M)=X, and each storage server 20 stores one member, the storage server 20 storing relatively few members cannot be selected as a replacement. Therefore, in a case in which each storage server 20 stores one member, how many replacements need to be selected to prevent data loss is a problem to be discussed in this embodiment.

Figure 5A:
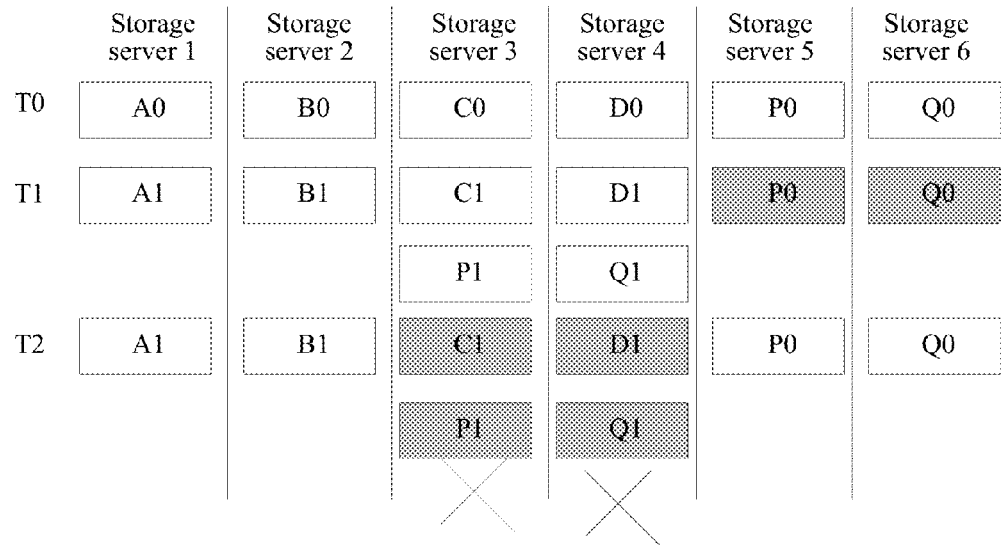

(1) As shown in FIG. 5A, it is assumed that at a time T0, data units and check units all are in a $0^{th}$ version, where P0 and Q0 are obtained through calculation by using the data units A0, B0, C0, and D0. A0, B0, C0, D0, P0, and Q0 are respectively stored in storage servers 1 to 6.

At a time T1, the storage server 5 and the storage server 6 are transiently out of service, and the check units P0 and Q0 stored in the storage server 5 and the storage server 6 are lost. In addition, all the rest data units and check units are updated to a $1^{st}$ version. In this case, because the storage server 5 and the storage server 6 are out of service, normal storage servers need to be selected from the other storage servers to work as replacements of the storage server 5 and the storage server 6. Assuming that the storage server 3 is used as a replacement of the storage server 5, the storage server 3 stores P1 besides C1. Assuming that the storage server 4 is used as a replacement of the storage server 6, the storage server 4 stores Q1 besides D1. P1 and Q1 may be obtained through calculation according to A1, B1, C1, and D1. It can be seen that, in this case, although the storage server 5 and the storage server 6 are transiently out of service, the RAID can still provide a degraded service.

Assuming that at a time T2, the storage server 5 and the storage server 6 are restored and join the RAID again, but the storage server 3 and the storage server 4 are permanently out of service, C1, D1, P1, and Q1 are lost. In this case, only A1 and B1 are stored in the stripe, and C1 and D1 cannot be obtained through calculation according to A1 and B1. As a result, data is lost forever.

Therefore, for the RAID 6, when two storage servers 20 are transiently out of service, resulting in that a quantity of the out-of-service members reaches a quantity of out-of-service members that is tolerable to the RAID 6, if one replacement is selected for each storage server 20, when another storage server 20 in the storage system 10 is permanently out of service, data is very likely to be lost. When only a single storage server is out of service or both the storage server 1 and the storage server 2 are out of service, a quantity of out-of-service members does not exceed a quantity of tolerable out-of-service members, which does not cause data loss. In other cases, for example, both the storage server 1 and the storage server 3 are out of service, a quantity of the out-of-service members exceeds a quantity of tolerable out-of-service members, which causes data loss.

Figure 5B:
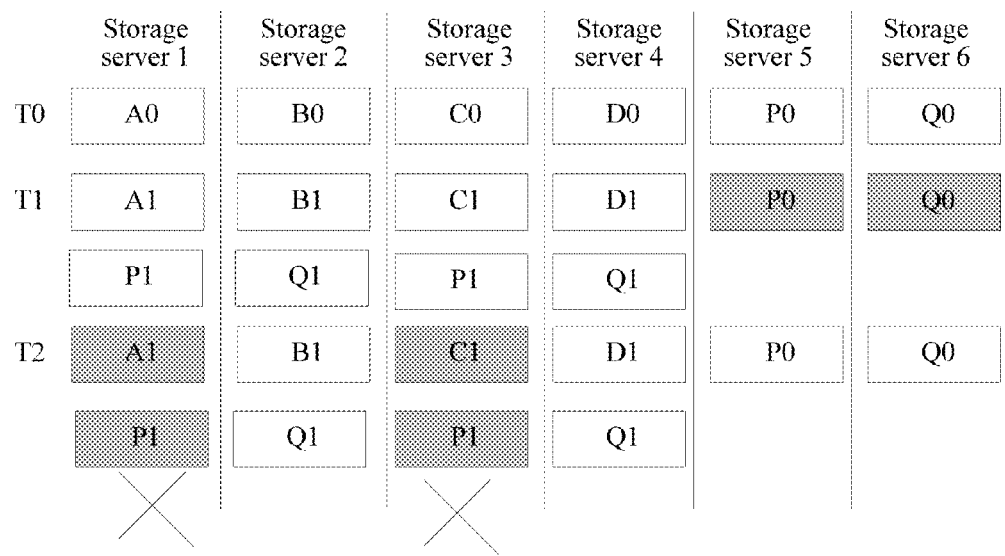

(2) As shown in FIG. 5B, if at a time T1, a storage server 5 and a storage server 6 are transiently out of service, two storage servers are separately selected as replacements of the storage server 5 and the storage server 6. For example, a storage server 1 and a storage server 3 are replacements of the storage server 5, and a storage server 2 and a storage server 4 are replacements of the storage server 6.

Then, at a time T2, when the storage server 5 and the storage server 6 are restored and join the RAID again, if the storage server 1 and the storage server 3 are permanently out of service, A1, C1, and P1 are lost. A1, C1, and P1 cannot be obtained through calculation according to B1, D1, and Q1, and data loss still occurs.

Therefore, for the RAID 6, when two storage servers 20 are transiently out of service, resulting in that a quantity of the out-of-service members reaches a quantity of out-of-service members that is tolerable to the RAID 6, if two replacements are selected for each storage server 20, when two more storage servers 20 in a storage system 10 are permanently out of service, data loss occurs.

(3) As shown in FIG. 5C, if at a time T1, a storage server 5 and a storage server 6 are transiently out of service, three storage servers are separately selected as replacements of the storage server 5 and the storage server 6. For example, a storage server 1, a storage server 2, and a storage server 3 are replacements of the storage server 5, and the storage server 1, the storage server 2, and a storage server 4 are replacements of the storage server 6.

Then, at a time T2, when the storage server 5 and the storage server 6 are restored and join the RAID again, even if any two storage servers are permanently out of service, data loss does not occur.

Therefore, for the case in which (N+M)=X, when a type of a RAID is RAID 6 and the RAID includes two check units, if two storage servers are transiently out of service, three replacements need to be selected for each storage server.

2. For a RAID 5, assuming that the RAID includes five storage servers 20, members of a stripe include four data units and one check unit, and a quantity of tolerable out-of-service members is 1.

For the scenario 2, when the storage system 10 includes enough hot spare servers 30, the hot spare servers 30 may be used as replacements of a transiently out-of-service storage server 20.

For the scenario 1, when the storage system 10 does not include a hot spare server 30, a storage server 20 that is not transiently out of service needs to be selected from the RAID to work as a replacement of a transiently out-of-service storage server 20.

(1) As shown in FIG. 5D, it is assumed that at a time T0, data units and a check unit all are in a $0^{th}$ version, where P0 is obtained through calculation according to the data units A0, B0, C0, and D0. A0, B0, C0, D0, and P0 are respectively stored in storage servers 1 to 5.

At a time T1, the storage server 5 is transiently out of service, and the check unit P0 stored in the storage server 5 is lost. In addition, all the rest data units and check units are updated to be in a $1^{st}$ version. In this case, if one storage server (for example, the storage server 3) is selected from the other storage servers for the storage server 5, the storage server 3 stores P1 besides C1, where P1 may be obtained through calculation according to A1, B1, C1, and D1. It can be seen that, in this case, although the storage server 5 is transiently out of service, the RAID can still provide a degraded service.

Assuming that at a time T2, the storage server 5 is restored and joins the RAID again, but the storage server 3 is permanently out of service, C1 and P1 are lost. In this case, only A1, B1, and D1 are stored in the stripe, and C1 and P1 cannot be obtained through calculation according to A1, B1, and D1. As a result, data is lost forever.

Therefore, for the RAID 5, when one storage server 20 is transiently out of service, resulting in that a quantity of the out-of-service members reaches a quantity of out-of-service members that is tolerable to the RAID 5, if one replacement is selected for the out-of-service storage server 20, when another storage server 20 in the storage system 10 is permanently out of service, data may be lost.

(2) As shown in FIG. 5E, if at a time T1, a storage server 5 is transiently out of service, two storage servers are selected as replacements of the storage server 5. For example, a storage server 2 and a storage server 3 are replacements of the storage server 5.

Then, at a time T2, when the storage server 5 is restored and joins the RAID again, if any storage service is permanently out of service, data loss does not occur.

Therefore, for the case in which (N+M)=X, when a type of a RAID is RAID 5, if one storage server is transiently out of service, two replacements need to be selected for the storage server.

Case 2: (N+M)>X, and (N+M) is equal to a multiple of X

For a RAID 6, when (N+M)>X, and (N+M) is equal to a multiple of X (for example, (N+M) is equal to twice of X), each storage server 20 stores an equal quantity of members. The case is similar to the case in which (N+M)=X. That is, when a type of a RAID is RAID 6, the RAID includes two check units, and each storage server stores two members, if one storage server is transiently out of service, two replacements need to be selected for each storage server. Details are not described herein again.

For a RAID 5, because a quantity of tolerable out-of-service members is 1, when each storage server 20 stores multiple members, none of the storage servers 20 is allowed to be out of service. Therefore, the case is not applicable to the RAID 5.

Case 3: (N+M)>X, and (N+M) is not equal to a multiple of X

For a RAID 6, it is assumed that the RAID includes five storage servers. Because members of a stripe include four data units and two check units, at least one storage server 20 stores more than one member of the stripe (a storage manner shown in Table 3). In addition, although a quantity of out-of-service members that is tolerable to the RAID 6 is 2, because at least one storage server 20 stores more than one member of the stripe, a quantity of out-of-service servers tolerable to the RAID 6 is 1.

For the scenario 2 (as shown in FIG. 3), when the storage system 10 includes enough hot spare servers 30, the hot spare servers 30 may be used as replacements of a transiently out-of-service storage server 20.

For the scenario 1 (as shown in FIG. 2), when the storage system 10 does not include a hot spare server 30, a storage server 20 that is not transiently out of service needs to be selected from the RAID to work as a replacement of a transiently out-of-service storage server 20.

Generally, there is a relatively low risk in data loss when a storage server 20 storing relatively few members is selected as a replacement, for example, a storage server 20 in which a quantity of stored members is less than (N+M)/X. Therefore, the storage server 20 in which a quantity of stored members is less than (N+M)/X may be preferentially selected as a replacement.

As shown in FIG. 5F, at a time T0, data units and check units all are in a $0^{th}$ version, where P0 and Q0 are obtained through calculation according to the data units A0, B0, C0, and D0. A0 and Q0 are stored in a storage server 1, B0 is stored in a storage server 2, C0 is stored in a storage server 3, D0 is stored in a storage server 4, and P0 is stored in a storage server 5.

At a time T1, the storage server 3 is transiently out of service, and the data unit C0 stored in the storage server 3 is lost. In addition, all the rest data units and check units are updated to be in a $1^{st}$ version. In this case, a storage server needs to be selected from the other normal storage servers to work as a replacement of the storage server 3.

If the storage server 2 is selected as the replacement of the storage server 3, the storage server stores C1 besides B1. C1 may be obtained through calculation according to A1, B1, D1, P1, and Q1.

Assuming that at a time T2, the storage server 3 is restored and joins the RAID again, even if any storage service is permanently out of service, data loss does not occur.

In an exemplary implementation manner, a storage server 20 storing the fewest members may be selected as the replacement, so that a risk in data loss is the lowest.

In another implementation manner, a storage server 20 in which a quantity of stored members is not less than (N+M)/X may also be selected as a replacement. However, in this case, if only one replacement is selected, data loss is still caused.

Figure 5G:
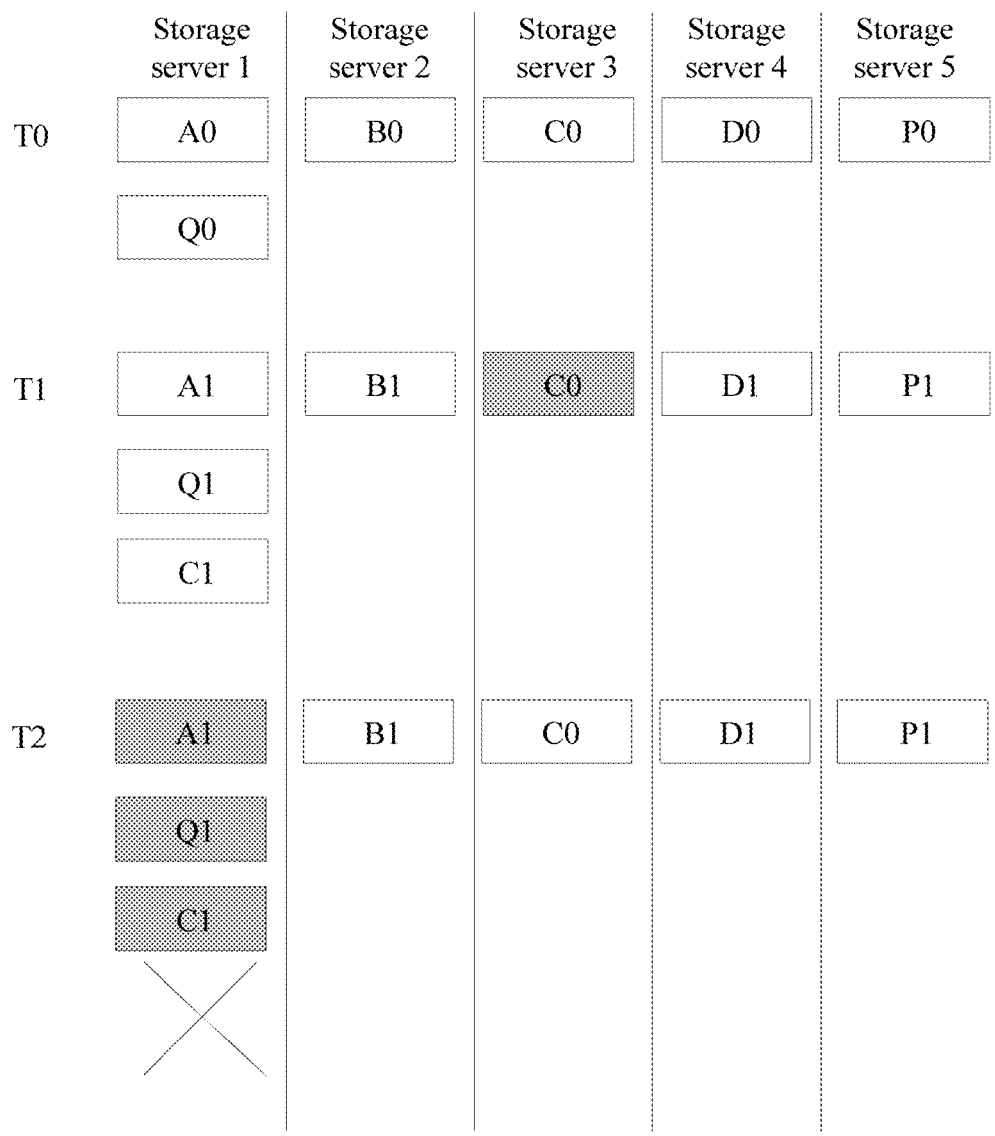

As shown in FIG. 5G, at a time T0, data units and check units all are in a $0^{th}$ version, where P0 and Q0 are obtained through calculation according to the data units A0, B0, C0, and D0. A0 and Q0 are stored in a storage server 1, B0 is stored in a storage server 2, C0 is stored in a storage server 3, D0 is stored in a storage server 4, and P0 is stored in a storage server 5.

At a time T1, the storage server 3 is transiently out of service, and the data unit C0 stored in the storage server 3 is lost. In addition, all the rest data units and check units are updated to be in a $1^{st}$ version.

If the storage server 1 is selected as a replacement of the storage server 3, where a quantity of members of the stripe that are stored in the storage server 1 is 2, which is greater than (N+M)/X. After being used as the replacement of the storage server 3, the storage server 1 stores C1 besides A1 and Q1. C1 may be obtained through calculation according to A1, B1, D1, P1, and Q1.

Assuming that at a time T2, the storage server 3 is restored and joins the RAID again, but the storage server 1 is permanently out of service, A1, C1, and Q1 are lost. In this case, only B1, D1, and P1 are stored in the stripe, and A1 and Q1 cannot be obtained through calculation. As a result, data loss occurs.

Therefore, if a storage server 20 in which a quantity of stored members is not less than (N+M)/X is selected as a replacement, one more storage server 20 needs to be selected as a replacement.

Figure 5H:
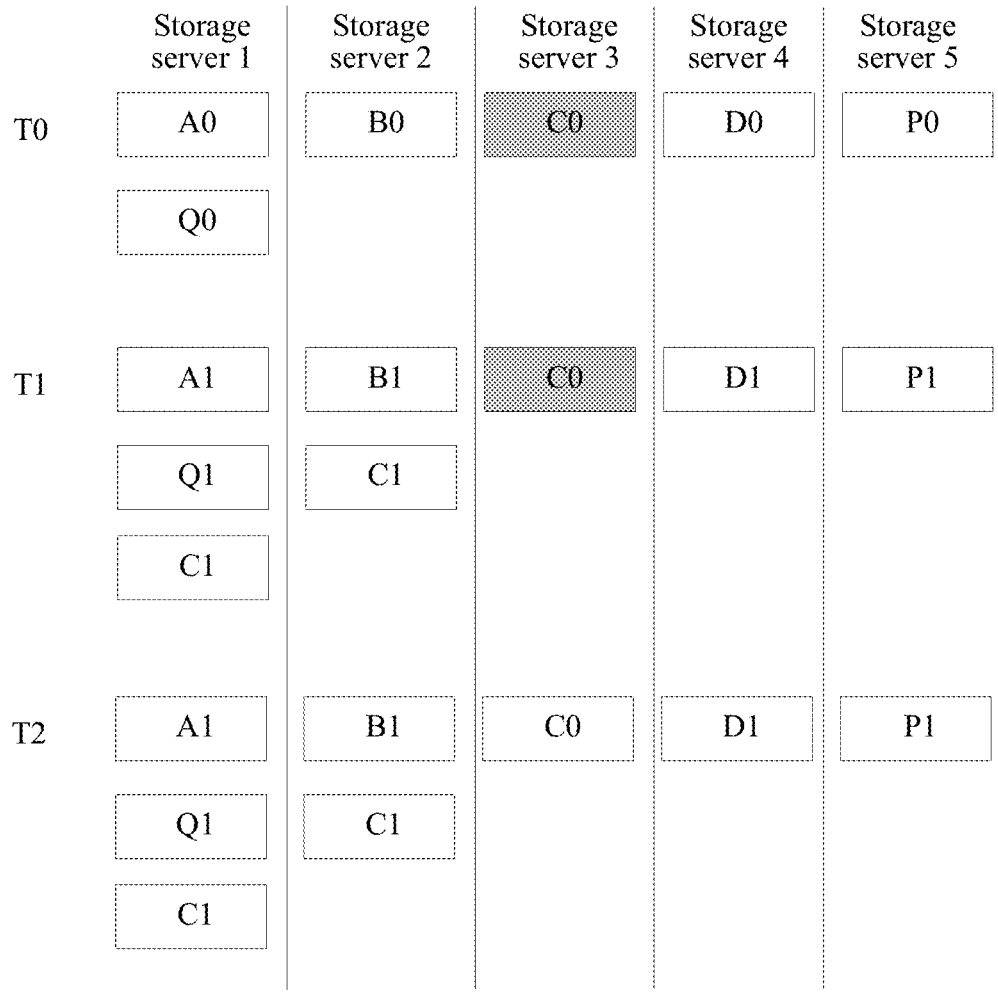

As shown in FIG. 5H, at a time T1, a storage server 1 and a storage server 2 may be selected together as replacements of the storage server 3. In this case, the storage server 1 stores A1, Q1, and C1, and the storage server 2 stores B1 and C1.

Assuming that at a time T2, the storage server 3 is restored and joins the RAID again, but the storage server 1 is permanently out of service, A1 and Q1 are lost. In this case, B1, C1, D1, and P1 are stored in the stripe, and A1 and Q1 can still be obtained through calculation. Data loss does not occur.

Similarly, assuming that at a time T2, the storage server 3 is restored and joins the RAID again, but the storage server 2 is permanently out of service, B1 is lost. In this case, A1, C1, D1, P1, and Q1 are stored in the stripe, and B1 can still be obtained through calculation. Data loss does not occur either.

Therefore, for the case in which (N+M)>X, and N+M is not equal to a multiple of X, when a type of a RAID is RAID 6, and the RAID includes two check units, if two storage servers are transiently out of service, two replacements need to be selected for each storage server.

With reference to the foregoing descriptions of the case in which N+M=X or the case in which (N+M)>X and N+M is equal to a multiple of X, when multiple storage servers 20 need to be selected as replacements, a quantity of replacements needs to be Y+1, where Y=M−(⌈(N+m)/X⌉−1), ⌈(N+M)/X⌉ represents performing rounding up on (N+M)/X, N represents a quantity of data units, M represents a quantity of check units, and X represents a quantity of storage servers 20.

In conclusion, when the storage system 10 does not include a hot spare server 30, in a case in which (N+M)>X, and N+M is not equal to a multiple of X, a storage server in which a quantity of stored members of a stripe is less than (N+M)/X may be preferentially selected as a replacement of a transiently out-of-service storage server. In this case, only one replacement is needed. Alternatively, storage servers in which quantities of stored members of a stripe are greater than (N+M)/X are selected as replacements of a transiently out-of-service storage server. In this case, Y+1 replacements are needed. In a case in which N+M=X or in a case in which (N+M)>X and N+M is equal to a multiple of X, because each storage server 20 stores an equal quantity of members, a storage server in which a quantity of stored members of a stripe is less than (N+M)/X cannot be selected as a replacement of a transiently out-of-service storage server. In this case, Y+1 replacements need to be selected.

The above description is also applicable to the scenario 3 (as shown in FIG. 4). A difference lies in that, for the scenario 3, the N data units and the M check units are stored in the disks 60. X represents a quantity of disks forming the RAID. Similarly, for the scenario 3, when a hot spare disk is not included, in the case in which (N+M)>X and N+M is not equal to a multiple of X, a disk 60 in which a quantity of stored members of the stripe is less than (N+M)/X may be preferentially selected as a replacement of a transiently out-of-service disk 60. In this case, only one replacement is needed. Alternatively, disks 60 in which quantities of stored members of the stripe are greater than (N+M)/X are selected as replacements of a transiently out-of-service disk 60. In this case, Y+1 replacements are needed. In the case in which N+M=X or in the case in which (N+M)>X and N+M is equal to a multiple of X, because each disk 60 stores an equal quantity of members, a disk 60 in which a quantity of stored members of the stripe is less than (N+M)/X cannot be selected as a replacement of a transiently out-of-service disk 60. In this case, Y+1 replacements need to be selected.

Figure 6:
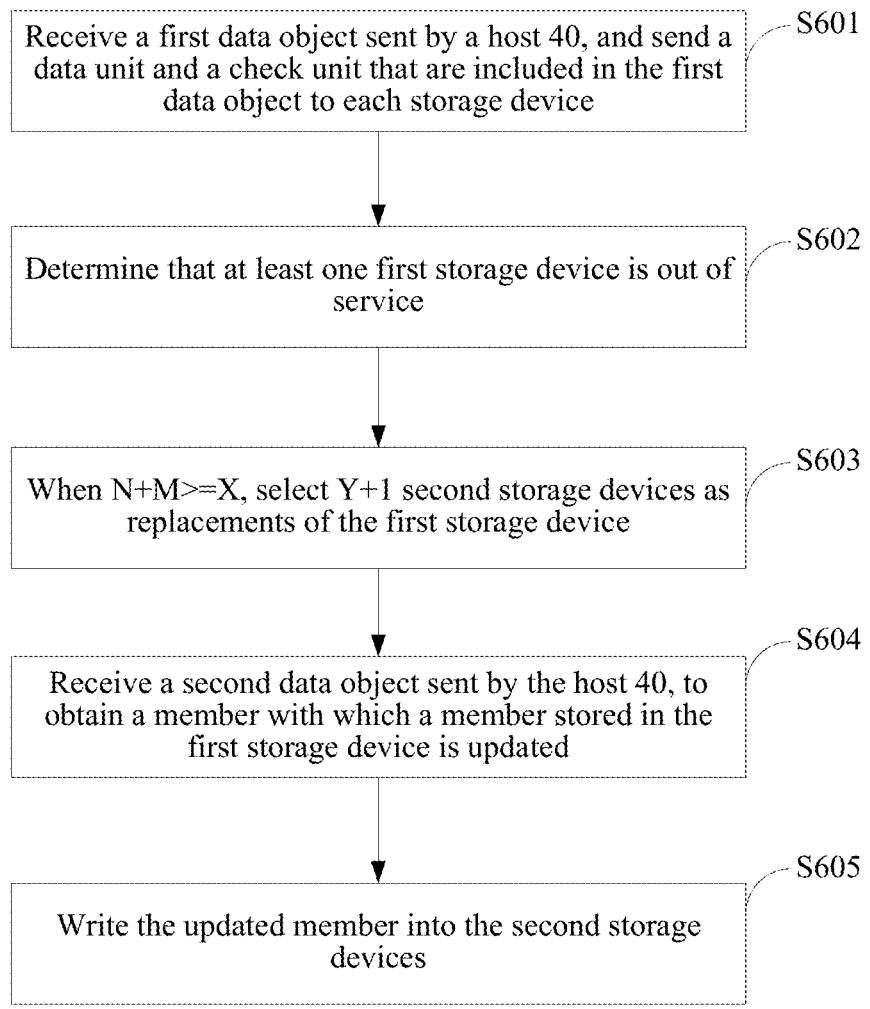
FIG. 6 is a flowchart of a method for writing data into a storage system according to an embodiment of the present application.

The following describes a method for writing data into a storage system according to an embodiment of the present application with reference to FIG. 6. As shown in FIG. 6, the method may be applied to the storage system 10 in FIG. 2 or FIG. 4. The storage system 10 includes at least one RAID, and the RAID includes a control device and X storage devices. The method is performed by the control device.

It should be noted that, when the method is applied to the storage system 10 shown in FIG. 2, the X storage devices refer to the storage servers 20 in FIG. 2, and the control device refers to any storage server 20 in FIG. 2 or a primary storage server 20 of the X storage servers 20.

In addition, when the method is applied to the storage system 10 shown in FIG. 4, the X storage devices refer to the disks 60 in FIG. 4, and the control device refers to the controller 50 in FIG. 4. Therefore, a body for executing the following steps is a processor 518 in the controller 50.

Step S601: Receive a first data object from a host 40, and separately send data units and check units that are included in the first data object to each storage device.

Specifically, after receiving the first data object, a control device may divide the first data object into N data units according to a type of the RAID and perform calculation on the N data units, so as to generate M check units. The N data units and the M check units form one data stripe, and each data unit or check unit is a member of the stripe, where $N \geq 2$, $M \geq 1$, and $N+M \geq X$.

In addition, after obtaining members of the stripe by means of dividing or generating, the control device may allocate an address to each member according to a preset rule. The address is used to represent a location, in which the member is to be stored, of a storage device. The control device may then send, according to the address allocated to each member, each member to a storage device corresponding to the address. In this embodiment, the control device may further save the address allocated to each member, an ID of the stripe, and a correspondence between members.

Step S602: Determine that at least one first storage device is out of service.

Optionally, in an implementation manner, the control device periodically sends a detection signal to each storage device. After receiving the detection signal, each storage device feeds back information of each stripe member stored in each storage device to the control device. The control device determines whether each storage device is in a normal working state.

Optionally, in another implementation manner, when the host 40 sends a read data request to a control device, because to-be-read data required by the read data request is stored in each storage device as a stripe, the control device needs to send a read instruction to each storage device. If one storage device is out of service, data fed back by the storage device is certainly invalid data. In such a manner, the control device may also determine whether each storage device is in a normal working state.

In this embodiment, there may be one or more out-of-service storage devices. When the type of the RAID is RAID 5, there is one out-of-service storage device, and one member is stored in the out-of-service storage device. When the type of the RAID is RAID 6, there may be one out-of-service storage device, and two members are stored in the out-of-service storage device, or there are two out-of-service storage devices, and one member is stored in each out-of-service storage device.

Step S603: When $N+M \geq X$, select Y+1 second storage devices as replacements of the first storage device, where $Y=Y=M-(\lceil (N+M)/X \rceil -1)$.

$N+M \geq X$ herein may be specifically N+M=X; or N+M>X, and N+M is equal to a multiple of X; or N+M>X, and N+M is not equal to a multiple of X. Selecting Y+1 second storage devices as replacements of the first storage device can ensure that after the first storage device joins the storage system 10 again, when another storage device is permanently out of service, provided that a quantity of members stored in the permanently out-of-service storage device does not exceed a quantity of out-of-service members that is allowed by the RAID, data loss does not occur. For a specific analysis process, refer to an example in FIG. 5C, FIG. 5E, or FIG. 5H, and details are not described herein again. It should be noted that, when N+M=X, the type of the RAID may be RAID 5 or RAID 6; when N+M>X, the type of the RAID is RAID 6.

Step S604: Receive a second data object sent by the host 40, to obtain a member with which a member stored in the first storage device is updated.

The second data object is a data object that is used to update the first data object and has a same stripe ID as the first data object. For example, after the control device receives the second data object, the control device may divide the second data object into N data units in the same way described in step S601, perform calculation on the N data units, so as to generate M check units, and moreover, allocate an address to each member according to the preset rule. When an address allocated to one or more members is the same as an address of a member stored in the first storage device, the one or more members having the same address are members with which the member stored in the first storage device is updated.

It should be noted that, there is no order between step S604 and step S603.

Step S605: Write the updated member into the second storage devices.

A main task of the second storage device, as a replacement of the first storage device, is to receive, in place of the first storage device, data that is originally to be written into the first storage device.

Figure 7:
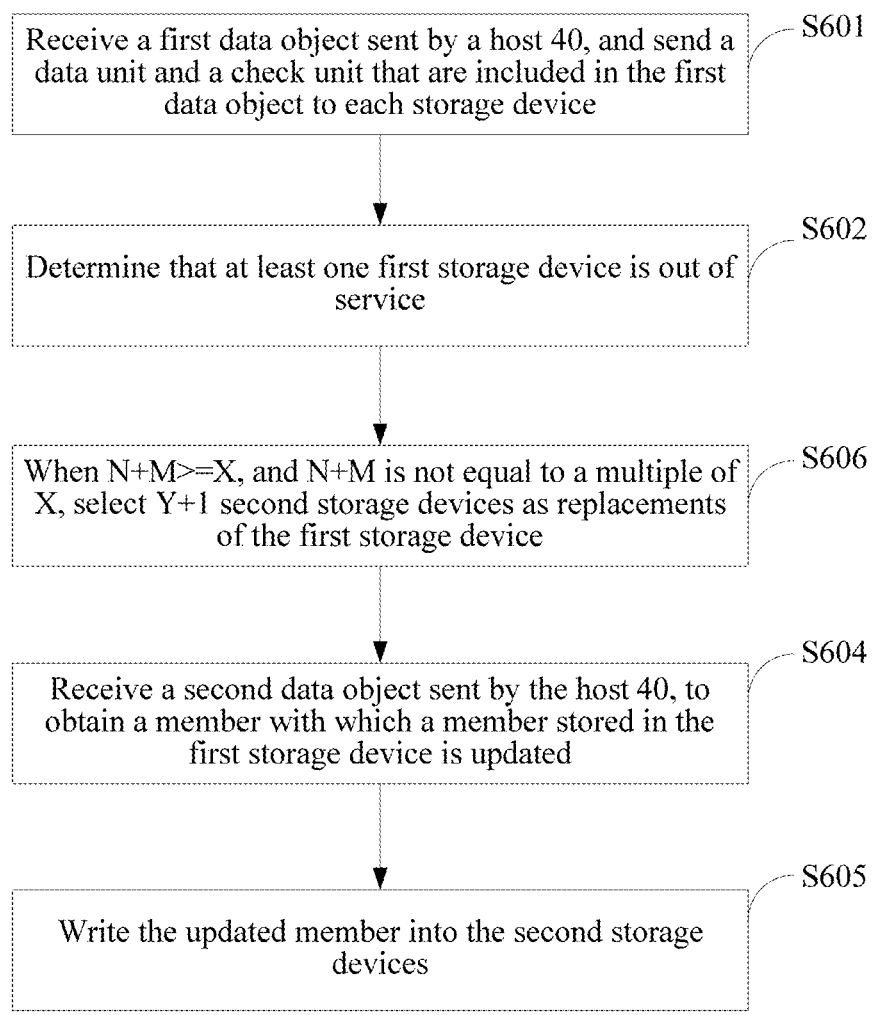
FIG. 7 is a flowchart of an implementation manner of the method for writing data into a storage system according to an embodiment of the present application.

Referring to FIG. 7, FIG. 7 shows another implementation manner of the foregoing embodiment.

In the implementation manner shown in FIG. 7, when N+M>X, and N+M is not equal to a multiple of X, in a preferred implementation manner, step S603 may be replaced with step S606, and the other steps are the same as the steps in the implementation manner shown in FIG. 6.

Step S606: Select second storage devices, where a quantity of members stored in the second storage device is less than (N+M)/X. In this case, even if a second storage device is selected as a replacement of the first storage device, when another storage device is permanently out of service after the first storage device joins the storage system 10 again, provided that a quantity of members stored in the permanently out-of-service storage device does not exceed a quantity of out-of-service members that is allowed by the RAID, data loss does not occur. For a specific analysis process, refer to an example in FIG. 5F, and details are not described herein again. Alternatively, in an optional implementation manner, the second storage device is a storage device of the X storage devices that stores the fewest members.

It can be seen that, compared with the implementation manner shown in FIG. 6, in the implementation manner shown in FIG. 7, fewer replacements may be selected for a transiently out-of-service storage device, thereby saving more resources to an extent.

It should be noted that, the implementation manner shown in step S606 is applicable to the RAID 6.

According to this embodiment of the present application, after a first storage device is transiently out of service, a proper replacement may be selected for the transiently out-of-service first storage device, so that when another storage device is permanently out of service after the first storage device joins a storage system again, provided that a quantity of members stored in the permanently out-of-service storage device does not exceed a quantity of out-of-service members that is allowed by the RAID, data loss does not occur, thereby ensuring data reliability.

An embodiment of the present application further provides a computer program product for data processing, including a computer readable storage medium that stores program code, where an instruction included in the program code is used to perform the method procedures of the foregoing method embodiments.

A person of ordinary skill in the art may understand that the foregoing storage medium includes any non-transitory computer-readable medium that can store program code, such as a USB flash drive, a removable hard disk, a magnetic disk, an optical disc, a random access memory (RAM), a solid state disk (SSD), or a non-volatile memory.

Finally, it should be noted that the foregoing embodiments are merely intended for describing the technical solutions of the present application, but not for limiting the present application.

What is claimed is:

1. A method for writing data into a storage system comprising a control device and X storage devices forming a redundant array of independent disks (RAID), wherein a data stripe having T stripe members is stored in the RAID, and wherein X and T are integers, the method comprising:
   when a first storage device of the RAID that stores at least one stripe member is out of service, selecting, by the control device, a second storage device of the RAID, wherein a quantity of stripe members of the data stripe stored in the second storage device is less than a ratio of T divided by X; and
   writing, by the control device, target data into the second storage device, wherein the target data is a data unit or a check unit that is used to update the at least one stripe member of the data stripe stored in the first storage device.

2. The method according to claim 1, wherein the T stripe members of the data stripe include N data units and M check units generated based on the N data units, N and M are integers, N≥2, and M≥1, and wherein T>X, and T is not equal to a multiple of X.

3. The method according to claim 1, wherein stripe members of the data stripe stored in the second storage device are less than stripe members of the data stripe stored in one of other storage devices of the RAID.

4. The method according to claim 1, wherein a quantity of stripe members of the data stripe stored in the first storage device is less than or equal to a quantity of out-of-service stripe members that is tolerable to the RAID.

5. A method for writing data into a storage system comprising a control device and X storage devices forming a redundant array of independent disks (RAID), wherein a data stripe stored in the RAID includes N+M stripe members in which N are data units and M are check units generated based on the N data units, and wherein X, M and N are integers, N≥2, M≥1, and N+M≥X; the method comprising:
   when a first storage device of the RAID that stores at least one stripe member is out of service, selecting, by the control device, Y+1 second storage devices of the RAID; and
   writing, by the control device, target data into the Y+1 second storage devices,
   wherein Y=M−(⌈(N+M)/X⌉−1), wherein the target data is one or more data units or one or more check units used to update the at least one stripe member of the data stripe stored in the first storage device, and wherein ⌈(N+M)/X⌉ is a ceiling function of (N+M)/X.

6. The method according to claim 5, wherein a quantity of stripe members of the data stripe stored in the first storage device is less than or equal to a quantity of out-of-service stripe members that is tolerable to the RAID.

7. The method according to claim 5, wherein X=6.

8. The method according to claim 5, wherein X=5 and N+M=X.

9. A storage system, comprising a control device and X storage devices forming a redundant array of independent disks (RAID), wherein a data stripe having T stripe members is stored in the RAID, wherein X and T are integers;
   wherein the control device is configured to:
   when a first storage device of the RAID that stores at least one stripe member is out of service, select a second storage device of the RAID, wherein a quantity of stripe members of the data stripe stored in the second storage device is less than a ratio of T divided by X; and
   write target data into the second storage device, wherein the target data is a data unit or a check unit that is used to update the at least one stripe member of the data stripe stored in the first storage device.

10. The system according to claim 9, wherein the T stripe members of the data stripe include N data units and M check units generated based on the N data units, N and M are integers, N≥2, and M≥1, and wherein T>X, and T is not equal to a multiple of X.

11. The system according to claim 9, wherein stripe members of the data stripe stored in the second storage device are less than stripe members of the data stripe stored in one of other storage devices of the RAID.

12. The system according to claim 9, wherein a quantity of stripe members of the data stripe stored in the first storage device is less than or equal to a quantity of out-of-service stripe members that is tolerable to the RAID.

13. A storage system, comprising a control device and X storage devices forming a redundant array of independent disks (RAID), wherein a data stripe stored in the RAID includes N+M stripe members in which N are data units and M are check units generated based on the N data units, and wherein X, M and N are integers, N≥2, M≥1, and N+M≥X;
  wherein the control device is configured to:
    when a first storage device of the RAID that stores at least one stripe member is out of service, select Y+1 second storage devices of the RAID; and
    write target data into the Y+1 second storage devices, wherein Y=M−($\lceil(N+M)/X\rceil$−1), wherein the target data is one or more data units or one or more check units used to update the at least one stripe member of the data stripe stored in the first storage device, and wherein $\lceil(N+M)/X\rceil$ is a ceiling function of $(N+M)/X$.

14. The system according to claim 13, wherein a quantity of stripe members of the data stripe stored in the first storage device is less than or equal to a quantity of out-of-service stripe members that is tolerable to the RAID.

15. The system according to claim 13, wherein X=6.

16. The system according to claim 13, wherein X=5 and N+M=X.

* * * * *